(12) United States Patent
Ribeiro et al.

(10) Patent No.: US 10,237,833 B2
(45) Date of Patent: Mar. 19, 2019

(54) APPARATUS AND METHOD FOR UPLINK POWER CONTROL FOR VARIABLE INTERFERENCE CONDITIONS

(75) Inventors: Cássio Barboza Ribeiro, Espoo (FI); Juha Sakari Korhonen, Espoo (FI); Esa Tapani Tiirola, Kempele (FI); Kari Pekka Pajukoski, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 448 days.

(21) Appl. No.: 14/233,367

(22) PCT Filed: Jun. 28, 2012

(86) PCT No.: PCT/FI2012/050682
§ 371 (c)(1),
(2), (4) Date: Jan. 16, 2014

(87) PCT Pub. No.: WO2013/014332
PCT Pub. Date: Jan. 31, 2013

(65) Prior Publication Data
US 2014/0133366 A1 May 15, 2014

Related U.S. Application Data

(60) Provisional application No. 61/512,403, filed on Jul. 28, 2011.

(51) Int. Cl.
*H04W 52/18* (2009.01)
*H04W 52/24* (2009.01)
(Continued)

(52) U.S. Cl.
CPC ......... *H04W 52/244* (2013.01); *H04J 3/1694* (2013.01); *H04W 52/146* (2013.01);
(Continued)

(58) Field of Classification Search
CPC . H04W 52/00; H04W 52/38; H04W 72/0473; H04W 52/146; H04W 52/18
See application file for complete search history.

(56) References Cited

U.S. PATENT DOCUMENTS

2009/0046693 A1  2/2009  Nory et al.
2009/0219800 A1  9/2009  Bocquet
(Continued)

FOREIGN PATENT DOCUMENTS

CN  101304272 A  11/2008
CN  101917729 A  12/2010
(Continued)

OTHER PUBLICATIONS

3GPP, "TS 36.211v.10.2.0", Jun. 2011, pp. 1-104.*
(Continued)

*Primary Examiner* — Salvador E Rivas
(74) *Attorney, Agent, or Firm* — Squire Patton Boggs (US) LLP

(57) ABSTRACT

According to an example embodiment of this application, a method may include by a processor, processing communication with a network element, the communication comprising one or more frames, wherein each frame comprises at least two subframes; receiving a signaling indicating definition of subframe groups; receiving a power control command for controlling a transmission power; and applying the power control command.

23 Claims, 12 Drawing Sheets

(51) Int. Cl.
   H04W 52/14     (2009.01)
   H04W 52/58     (2009.01)
   H04J 3/16      (2006.01)
   H04W 52/34     (2009.01)
   H04W 52/22     (2009.01)

(52) U.S. Cl.
   CPC ......... H04W 52/18 (2013.01); H04W 52/248 (2013.01); H04W 52/346 (2013.01); H04W 52/58 (2013.01); *H04W 52/228* (2013.01)

(56) References Cited

U.S. PATENT DOCUMENTS

| | | | |
|---|---|---|---|
| 2009/0325625 A1 | 12/2009 | Hugl et al. | |
| 2010/0189093 A1* | 7/2010 | Palanki | H04W 52/16 370/344 |
| 2011/0103290 A1* | 5/2011 | Suzuki | H04L 5/0023 370/312 |
| 2011/0159914 A1 | 6/2011 | Chen et al. | |
| 2012/0157155 A1* | 6/2012 | Cho | H04W 52/54 455/522 |
| 2012/0188974 A1* | 7/2012 | Qiang | H04W 52/146 370/329 |
| 2012/0282972 A1* | 11/2012 | Folkstedt | H04W 52/40 455/522 |
| 2013/0182654 A1* | 7/2013 | Hariharan | H04W 52/54 370/329 |
| 2013/0225226 A1* | 8/2013 | Manssour | H04W 52/242 455/522 |

FOREIGN PATENT DOCUMENTS

| | | | |
|---|---|---|---|
| WO | 2007/055465 A1 | 5/2007 | |
| WO | 2009023726 | 2/2009 | |
| WO | 2010/049587 A1 | 5/2010 | |
| WO | 2010090567 | 8/2010 | |
| WO | WO 2010085055 A3 * | 9/2010 | ............ H04W 28/26 |
| WO | 2011/053990 A1 | 5/2011 | |
| WO | 2011/119973 A1 | 9/2011 | |
| WO | 2011120716 | 10/2011 | |

OTHER PUBLICATIONS

3GPP, "TS 36.211v.10.1.0", Mar. 2011, pp. 1-104.*
English Translation for WO 2010085055 A3.*
3GPP, "TS 36.211v.10.1.0", Mar. 2011, pp. 1-104 (Year: 2011).*
English Translation for WO 2010085055 A3 (Year: 2015).*
Office action received for corresponding Korean Patent Application No. 2014-7005382, dated Oct. 12, 2015, 4 pages of office action and no page of office action translation available.
Office action received for corresponding Korean Patent Application No. 2014-7005382, dated May 20, 2015, 5 pages of office action and no page of office action translation available.
"New study item proposal for Further Enhancements to LTE TDD for DL-UL Interference Management and Traffic Adaptation", 3GPP TSG-RAN Meeting #51, RP-110450, CATT, Ericsson, ST-Ericsson, Agenda Item: 14.2, Mar. 15-18, 2010, 6 pages.
"3rd Generation Partnership Project; Technical Specification Group Radio Access Network; Evolved Universal Terrestrial Radio Access (E-UTRA); Physical Layer Procedures (Release 9)", 3GPP TS 36.213, V9.2.0, Jun. 2010, pp. 1-80.
Extended European Search Report received for corresponding European Patent Application No. 12817732.6, dated Feb. 12, 2015, 6 pages.
International Search Report received for corresponding Patent Cooperation Treaty Application No. PCT/FI2012/050682 dated Nov. 6, 2012, 4 pages.
Chinese Patent Office, Office Action corresponding to Patent Application No. 201280037759.6, dated Aug. 3, 2016.
State Intellectual Property Office of the Peoples Republic of China, Office Action corresponding to Chinese Patent Appln. No. 2012800037759.6, dated Jan. 18, 2017.
Chinese Patent Office, Office Action corresponding to Chinese Patent Application No. 201280037759.6, dated May 2, 2017.

* cited by examiner

APPARATUS AND METHOD FOR UPLINK POWER CONTROL FOR VARIABLE INTERFERENCE CONDITIONS

RELATED APPLICATION

This application was originally filed as PCT Application No. PCT/FI2012/050682 filed Jun. 28, 2012, which claims priority benefit from U.S. Application No. 61/512,403, filed Jul. 28, 2011.

TECHNICAL FIELD

The present invention relates generally to an apparatus and a method for uplink power control for variable interference conditions.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

In wireless communication, different collections of communication protocols are available to provide different types of services and capabilities. The long term evolution (LTE) is one of such collection of wireless communication protocols that extends and improves the performance of existing UMTS (universal mobile telecommunications system) protocols and is specified by different releases of the standard by the 3$^{rd}$ generation partnership project (3GPP) in the area of mobile network technology.

Of interest herein are the further releases of 3GPP LTE targeted towards future international mobile telephony-advanced (IMT-A) systems, referred to herein for convenience simply as LTE-Advanced (LTE-A). A goal of LTE-A is to provide significantly enhanced services by means of higher data rates and lower latency with reduced cost. LTE-A is directed toward extending and optimizing the current 3GPP LTE radio access technologies to provide higher data rates at very low cost. LTE-A will be a more optimized radio system fulfilling the international telecommunication union radiocommunication sector (ITU-R) requirements for IMT-A while maintaining backward compatibility with the current LTE release.

Both time-division duplexing (TDD) and frequency-division duplexing (FDD) schemes are adopted in LTE. In LTE TDD scheme, the downlink (DL) transmission (from the network to the user equipment) and the uplink (UL) transmission (from the user equipment to the network) are operated at same carrier frequency, but allocated different time portion, or the so-called subframes. In LTE-A, several UL/DL subframe configurations are available for semistatic selection according to the ratio of UL and DL data. Recently, dynamic allocation of subframes to UL or DL is considered.

The concept of heterogeneous network has attracted considerable attention to optimize performance particularly for unequal user or traffic distribution. In a heterogeneous network, different layers of cells are deployed in a less well planed or even uncoordinatedly manner. To combat with the challenge of interference management, different enhanced inter-cell interference coordination (eICIC) technologies are studied, one of which is the time domain (TDM) eICIC. In TDM eICIC, almost blank subframes (ABS) are used to manage interference in DL, thus creating variable interference pattern at the receiver.

SUMMARY

Various aspects of examples of the invention are set out in the claims.

According to a first aspect of the present invention, a method may include by a processor, processing communication with a network element, the communication comprising one or more frames, wherein each frame comprises at least two subframes; receiving a signaling indicating definition of subframe groups; receiving a power control command for controlling a transmission power; and applying the power control command.

According to a second aspect of the present invention, an apparatus may include at least one processor, and at least one memory including computer program code, wherein the at least one memory and the computer program code configured to, with the at least one processor, cause the apparatus at least to process communication with a network element, the communication comprising one or more frames, wherein each frame comprises at least two subframes; receive a signaling indicating definition of subframe groups; receive a power control command for controlling a transmission power; and apply the power control command.

According to a third aspect of the present invention, a computer program product comprising a computer-readable medium bearing computer program code embodied therein for use with a computer, the computer program code may include code for processing communication with a network element, the communication comprising one or more frames, wherein each frame comprises at least two subframes; code for receiving a signaling indicating definition of subframe groups; code for receiving a power control command for controlling a transmission power; and code for applying the power control command.

According to a fourth aspect of the present invention, an apparatus may include means for processing communication with a network element, the communication comprising one or more frames, wherein each frame comprises at least two subframes; means for receiving a signaling indicating definition of subframe groups; means for receiving a power control command for controlling a transmission power; and means for applying the power control command.

According to a fifth aspect of the present invention, a method may include by a processor, processing communication with a user equipment, the communication comprising one or more frames, wherein each frame comprises at least two subframes; defining various subframe groups; generating a signaling indicating definition of subframe groups; and generating a power control command for controlling a transmission power of the user equipment.

According to a sixth aspect of the present invention, an apparatus may include at least one processor, and at least one memory including computer program code, wherein the at least one memory and the computer program code configured to, with the at least one processor, cause the apparatus at least to, process communication with a user equipment, the communication comprising one or more frames, wherein each frame comprises at least two subframes; define various subframe groups; generate a signaling indicating definition of subframe groups; and generate a power control command for controlling a transmission power of the user equipment.

According to a seventh aspect of the present invention, a computer program product comprising a computer-readable medium bearing computer program code embodied therein for use with a computer, the computer program code may include code for processing communication with a user equipment, the communication comprising one or more frames, wherein each frame comprises at least two subframes; code for defining various subframe groups; code for generating a signaling indicating definition of subframe groups; and code for generating a power control command for controlling a transmission power of the user equipment.

According to a eighth aspect of the present invention, an apparatus may include means for processing communication with a user equipment, the communication comprising one or more frames, wherein each frame comprises at least two subframes; means for defining various subframe groups; means for generating a signaling indicating definition of subframe groups; and means for generating a power control command for controlling a transmission power of the user equipment.

The aspects of the invention as set out herein above and in the accompanying independent claims may be suitably combined with each other and with any of the embodiments described herein below and in the dependent claims in any manner apparent to one of ordinary skill in the art.

BRIEF DESCRIPTION OF THE DRAWINGS

For a more complete understanding of example embodiments of the present invention, reference is now made to the following descriptions taken in connection with the accompanying drawings, which are by way of example only, in which.

DETAILED DESCRIPTION

Figure 1:
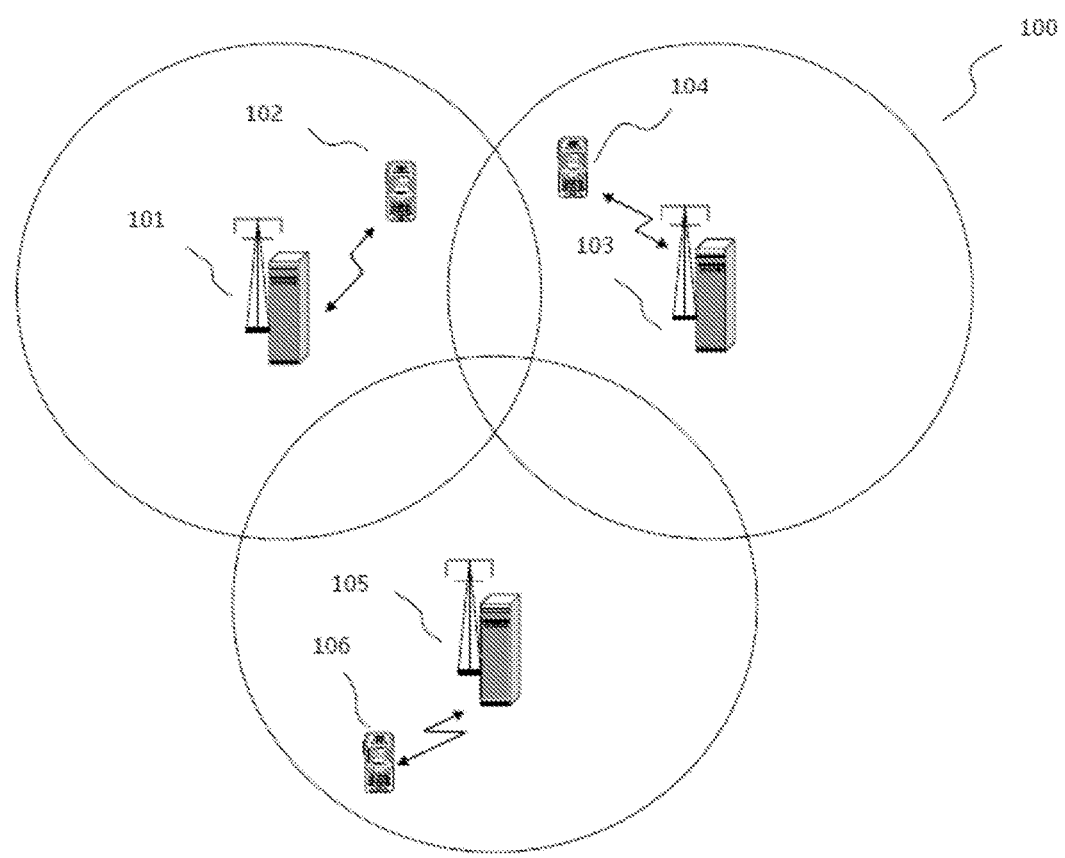
FIG. 1 illustrates an example wireless system in accordance with an example embodiment of the invention.

FIG. 1 illustrates an example wireless system 100 in accordance with an example embodiment of the application.

The example wireless system 100 comprises three $3^{rd}$ generation partnership project (3GPP) evolved Node Bs (eNBs) 101, 103 and 105, each communicating with a user equipment (UE) 102, 104 and 106, respectively. Although three eNBs and just one UE for each eNB are shown in FIG. 1, the example wireless system 100 may comprise more or less eNBs and more UEs for each eNB. In FIG. 1, the coverage of eNBs may overlap with each other and the overlapped area is usually referred to as cell edge. When a UE travels into or close to the cell edge, the inter-cell interference may become severe.

Figure 2:
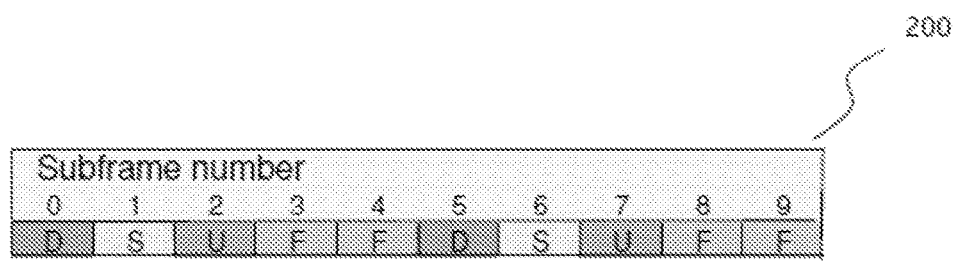
FIG. 2 shows an example long term evolution (LTE) time-division duplexing (TDD) frame structure suitable for flexible uplink (UL) and downlink (DL) operation in accordance with an example embodiment of the application.

FIG. 2 shows an example long term evolution (LTE) time-division duplexing (TDD) frame structure 200 suitable for flexible uplink (UL) and downlink (DL) operation in accordance with an example embodiment of the application. In FIG. 2, one LTE TDD radio frame has 10 subframes denoted from 0 to 9. "D" denotes the subframe reserved for downlink transmissions, "U" denotes the subframe reserved for uplink transmissions, "S" denotes a special subframe with the three fields DwPTS, GP and UpPTS, and "F" denotes the flexible subframe that can be dynamically assigned as either UL or DL subframe. In the example of FIG. 2, uplink activity factor can be adjusted dynamically from 20% to 60%.

Figure 3:
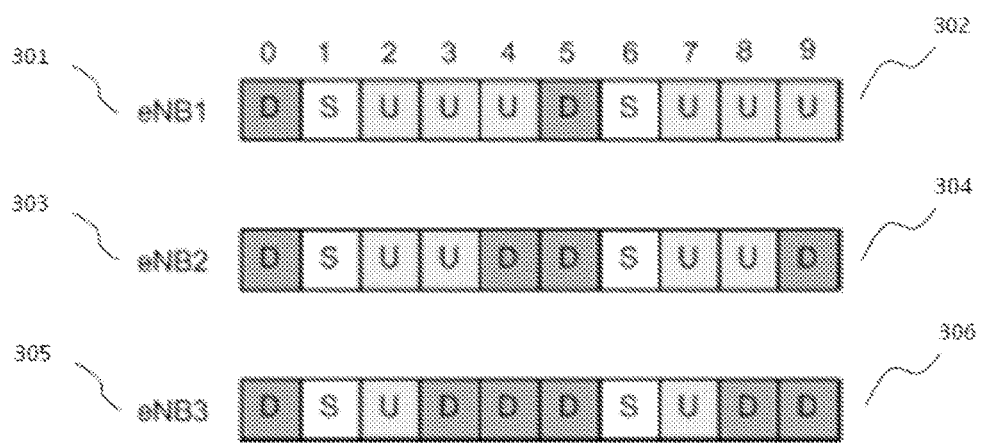
FIG. 3 shows an example scenario with different TDD frame configurations in adjacent cells in accordance with an example embodiment of the application.

FIG. 3 shows an example scenario with different TDD frame configurations in adjacent cells in accordance with an example embodiment of the application. FIG. 3 uses a LTE TDD system with three eNBs 301, 303 and 305, each of which is configured a frame structure 302, 304 and 306, respectively. In an example embodiment, the eNBs 301, 303 and 305 can be deployed in geographic locations similarly as those of eNBs 101, 103 and 105 of FIG. 1. If a TDD frame configuration is made flexible in order to, e.g., adjust to traffic variations within a cell, the UL/DL subframe configuration may be different for different eNBs. In an example embodiment, the example flexible frame structure illustrated in FIG. 2 is adopted. In this case, one LTE TDD radio frame, e.g., 302, 304 or 306, has 10 subframes and the UL/DL configuration is denoted by "D", "U" and "S" similarly as in FIG. 2. The interference levels at the receiver can vary substantially in different subframes. For example, in the scenario shown in FIG. 3, the sources of interference seen by eNB1 301 in the uplink subframes vary from UL transmissions of UEs in neighboring eNB2 303 and eNB3 305 to DL transmissions from neighboring eNB2 303 and eNB3 305. Specifically, the interference observed by eNB1 in subframe 2 is mainly caused by the uplink transmission in neighboring cells of eNB2 and eNB3, the interference observed by eNB1 in subframe 3 is mainly caused by the uplink transmission in cell of eNB2 and the downlink transmission in cell of eNB3, and the interference observed by eNB1 in subframe 4 is mainly caused by the downlink transmission in cells of eNB2 and eNB3.

On the other hand, an UL transmission from one cell may cause significant interference to DL reception of another UE in a different cell. For example, in FIG. 1, if UEs 102 and 104 are both in cell edge area between cells of eNBs 101 and 103, and the eNBs 101 and 103 have TDD frame configurations as eNBs 301 and 303 in FIG. 3, respectively, the UL transmission from UE 102 to eNB 101 during subframe 4 may interfere the DL reception of UE 104 from eNB 103. In this case, optimization of system performance would include reduced transmit power from UE 102 in the subframes where it is causing higher interference to UE 104.

Note that although the time unit of subframe is assumed in the example scenario shown in FIG. 3, other time unit may be also adopted when the transmit power of UE needs to be well controlled. For example, enhanced inter-cell interference coordination (eICIC) proposes to protect control signals, where the transmission power strategy could be changed within one subframe.

Figure 4:
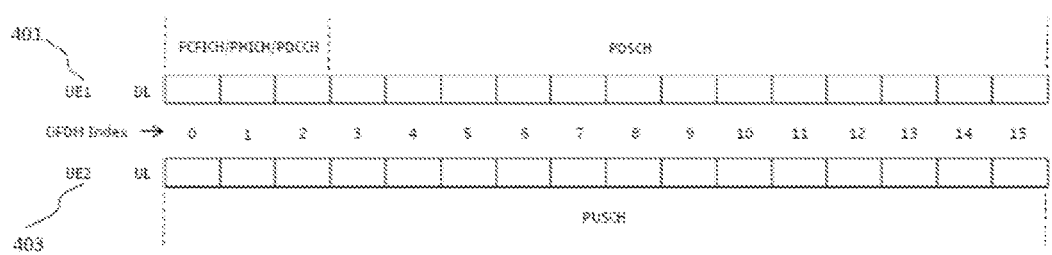
FIG. 4 illustrates an example scenario where the downlink control signals of a user equipment (UE) are protected from the uplink interference generated by another UE in accordance with an example embodiment of the application.

FIG. 4 illustrates an example scenario where the downlink control signals of a UE are protected from the uplink interference generated by another UE in accordance with an example embodiment of the application. In FIG. 4, the downlink control signals for UE1 401, for example, in LTE, the physical control format indicator channel (PCFICH), the physical hybrid automatic repeat request indicator channel (PHICH) and/or the physical downlink control channel (PDCCH), are located in the first and possibly also in the second and the third orthogonal frequency division multiplexing (OFDM) symbols, i.e., OFDM symbols 0, 1 and 2 of FIG. 4. The other downlink OFDM symbols 3 to 15 may carry user data, for example, the physical downlink shared channel (PDSCH). In the same time, a neighboring UE2 403 is transmitting on the same carrier frequency as that of UE1 401 an uplink signal, for example, the physical uplink shared channel (PUSCH), in its uplink OFDM symbols 0 through 15. In this case, the reception of the downlink control signals by UE1 401 may suffer from severe UL-to-DL interference generated by UE2 403. Since typically the control signal, e.g., the PCFICH/PHICH/PDCCH, is more critical than the data signal, e.g., the PDSCH, it might be desirable to be able to adjust the transmission power of UE2 403 separately for different portions of its uplink.

Based on the above discussion, it may be convenient to generalize the definition of frame and subframe in the context of this application. While the frame can be referred to a temporal unit between two communicating peers, e.g., a network element (NE) and a UE, the subframe may be defined as any temporal portion of the frame, without any loss of generality.

In an example embodiment, for optimal operation of UL transmissions, UE needs to adapt the transmission power levels for the different interference situations in the different subframes. While LTE specifications support power control commands which allow for fine adjustments on UE transmit power, the dynamics of interference, e.g., introduced by flexible TDD configuration, can be beyond the dynamic range of the adjustment granularity supported by current specifications. The requirements for UL time domain (TDM)-based eICIC are similar compared to the flexible TDD frame configuration. Therefore, an appropriate UL power control scheme may be desired.

3GPP LTE supports power control for UL transmissions, provided it does not go beyond a maximum configured power level. The transmit power control (TPC) commands sent by the eNB provide adjustments to the power levels of the UEs. The power levels of the UEs also depend on some parameters that may be controlled by higher layers. For example, according to 3GPP, "TS 36.213 Physical Layer Procedure", v9.2.0 (2010-06), subclause 5.1.1, which is incorporated herein by reference in its entirety, the setting of the UE transmit power for the physical uplink shared channel (PUSCH) transmission depends on a cell specific nominal component $P_{O\_NOMINAL\_PUSCH}$ (j) provided from higher layers for j=0 and 1 and a UE specific component $P_{O\_UE\_PUSCH}$ (j) provided by higher layers for j=0 and 1. Without any loss of generality, we may refer both $P_{O\_NOMINAL\_PUSCH}$ (j) and $P_{O\_UE\_PUSCH}$ (j) to reference levels of power control.

There are two types of power control commands: absolute power control command and accumulative power control command. After receiving an absolute power control command, the UE adjusts its transmission power to a certain absolute value determined based on the received absolute power control command. When the UE receives an accumulative power control command, the UE changes its transmission power relatively to the transmission power of an earlier time based on the received accumulative power control command.

The TPC commands can be transmitted in several different ways. In an example embodiment, the TPC commands are included in physical downlink control channel (PDCCH) downlink control information (DCI) format 0 or 4. In LTE, various DCI formats are defined for different purpose of the control message. The PDCCH DCI formats 0 and 4 contain PUSCH allocation information and TPC command for a single UE. Both accumulative and absolute commands can be included. In other example embodiments, the TPC command can be conveyed in PDCCH DCI format 3/3A. The PDCCH DCI format 3/3A contains TPC commands but may not contain PUSCH allocation. In an example embodiment, TPC commands for several UEs may be multiplexed to the same PDCCH DCI format 3/3A message. UE may find its control command by its identity TPC-PUSCH-RNTI, which identifies the format 3/3A message and TPC_Index, which identifies the control command for the UE inside the message.

In an example embodiment, a separate power control procedure may be used for physical uplink control channel (PUCCH). Instead of a PDCCH DCI format 0 message, the power control command for PUCCH may be included in a DL assignment message. It may be sent also in a PDCCH DCI format 3/3A message and may be shared with other UEs addressed with their respective identities TPC-PUCCH-RNTI;

In an example embodiment, subframes that may be treated similarly in terms of power control are defined as one subframe group (SFG). For example, for the scenario of FIG. 3, assuming the frame configurations in different cells are stable for a certain number of frames, eNB1 may define three SFGs {2,7}, {3,8}, and {4,9}. In another example based on the scenario of FIG. 2, in case the interference observed in some of those SFGs are similar, or if there is frequent variation of frame configuration in neighboring cells, one may define only two SFGs: {2,7} and {3,4,8,9}. In another example based on the scenario of FIG. 4, it may be appropriate to define two SFGs: {0, 1, 2} and {3 to 15}.

In an example embodiment, the SFGs may be defined by eNB based on interference measurements. In another example embodiment, eNBs may exchange information on the selected frame configuration and determine the SFGs.

In an example embodiment, separate reference levels of power control for different SFGs may be defined by means of cell specific parameter $P_{O\_NOMINAL\_PUSCH}$ (j) or UE specific parameter $P_{O\_UE\_PUSCH}$ (j) which may be modified such that it is signaled for different SFGs, denoted here as $P_{O\_NOMINAL\_PUSCH}$ (J, SFG) and $P_{O\_UE\_PUSCH}$ (j, SFG), respectively.

In an example embodiment, the UE may be configured to adapt the power independently in each SFG.

In an example embodiment, TPC commands included in a message, e.g., a PDCCH DCI format 0 message, are applied for the subframe where the UE is currently scheduled. Therefore, for UEs configured for absolute TPC commands, it may be sufficient that the power levels of one subframe is set by the reference level of power control, e.g., $P_{O\_NOMINAL\_PUSCH}$ (j, SFG) or $P_{O\_UE\_PUSCH}$ (j, SFG), and the received TPC command.

For UEs configured for accumulative TPC commands, there are different ways in which the TPC commands can be interpreted. In an example embodiment, the accumulative TPC command may be applied to more than one SFG where the UE is and will be scheduled. In an example embodiment, the accumulative TPC command may be applied to the subframe where the UE is currently scheduled and the corresponding subframes belonging to the same SFG where the UE will be scheduled. In an example embodiment, the UE may be configured by higher layers how to interpret the power control commands.

In an example embodiment, the accumulative TPC command is conveyed in a PDCCH DCI format 3/3A message. In another example embodiment, the accumulative TPC command may be conveyed in a PDCCH DCI format 0 message if the UE is configured to interpret the TPC command in this manner.

Figure 5:
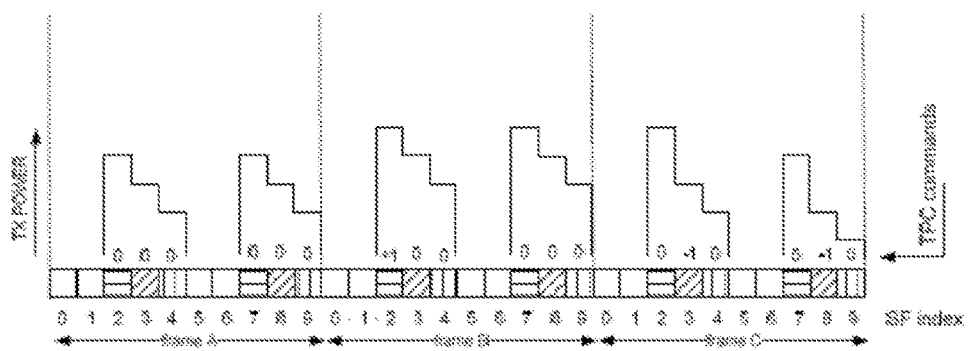
FIG. 5 shows an example of power control in accordance with an example embodiment of the application.

FIG. 5 shows an example of power control in accordance with an example embodiment of the application. In this example, three SFGs are defined: {2, 7}, {3, 8} and {4, 9}, and they are respectively denoted by three different boxes in FIG. 5. FIG. 5 shows three frames A, B and C, although the number of frames is not limited to three. The subframe is represented by the frame index and subframe index. For example, the subframe 2 of frame A is denoted as A2, the subframe 8 of frame B is denoted as B8, and so on. In this example, the UE, such as UE 102 of FIG. 1, receives three accumulative TPC commands: +1 dB for subframe B2, −1 dB for subframe C3, and −1 dB for subframe C8. In an example embodiment, the TPC command 0 means that the UE does not receive a TPC command. In another example embodiment, the TPC command 0 means that the UE receives a TPC command with value of 0 dB. In FIG. 5, the three SFGs have different power levels in frame A, because separate reference levels of power control have been assigned to them, e.g., separate $P_{O\_NOMINAL\_PUSCH}$ (j, SFG) and/or $P_{O\_UE\_PUSCH}$ (j, SFG).

In the example illustrated in FIG. 5, it is considered that the accumulative TPC command is applied to more than one SFGs where the UE is and will be scheduled. In this example, assume that the TPC command is valid for all SFGs. At subframe B2, the UE receives the accumulative TPC command +1 dB and increases the transmission power by 1 dB at subframe B2. Since this TPC command is applied to all SFGs, the power level at subframe B3, which is the first subframe in a different SFG {3, 8} from that of subframe B2 {2, 7}, is also increased by 1 dB, if the UE is allocated subframe B3 Similarly, if the UE is also allocated subframe B4, since subframe B4 is the first subframe in SFG {4, 9} after the UE receives this +1 dB TPC, its power level is increased by 1 dB, too.

Continuing in the example of FIG. 5, since TPC command is 0 at subframes B7, B8, and B9, which belongs to SFGs {2, 7}, {3, 8} and {4, 9}, respectively, the power levels of subframes B7, B8 and B9 are kept substantially the same as their corresponding previous subframes in their SFGs, i.e., subframes B2, B3, and B4, respectively. At subframe C2, the UE has not received a new TPC command, the power level of C2 is kept substantially the same as its previous subframe of the SFG {2, 7}, i.e., subframe B7. At subframe C3, a new accumulative TPC command −1 dB is received, therefore, the UE decreases the power level of C3 by 1 dB. Since subframes C4 and C7 are the first subframes in their corresponding SFGs after the new TPC command, their power levels are decreased by 1 dB relatively to their respective previous subframe B9 and C2. At subframe C8, another accumulative TPC command −1 dB is received. Hence, the power levels of C8 and C9 are decreased by 1 dB following the same procedure.

Figure 6:
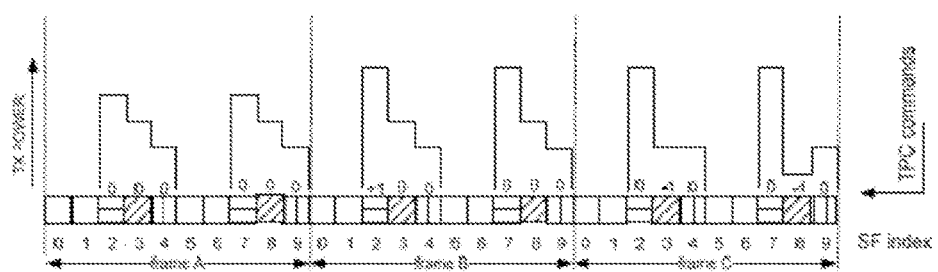
FIG. 6 shows another example of power control in accordance with an example embodiment of the application.

FIG. 6 shows another example of power control in accordance with an example embodiment of the application. In FIG. 6, the accumulative TPC command is applied to the subframe where the UE is currently scheduled and the corresponding subframes in the same SFG where the UE will be scheduled. In this example, we assume substantially the same setup and notation as those in the example of FIG. 5, i.e., three SFGs {2, 7}, {3, 8} and {4, 9}, respectively denoted by three different boxes, three frames A, B and C, and the subframe is represented by the frame index and subframe index.

In this example, the UE, e.g., the UE 102 in FIG. 1, receives three accumulative TPC commands: +1 dB for subframe B2, −1 dB for subframe C3, and −1 dB for subframe C8. The three SFGs have different power levels in frame A, because separate reference levels of power control have been assigned to them, e.g., separate $P_{O\_NOMINAL\_PUSCH}$ (j, SFG) and/or $P_{O\_UE\_PUSCH}$ (j, SFG).

In the example illustrated in FIG. 6, at subframe B2, the UE receives the accumulative TPC command +1 dB and increases the transmission power by 1 dB at subframe B2. Since this TPC command is only applied to the SFG {2, 7}, the power levels of subframes B3 and B4 are not affected by the received TPC command.

Continuing in the example of FIG. 6, since TPC command is 0 at subframes B7, B8, and B9, which belongs to SFGs {2, 7}, {3, 8} and {4, 9}, respectively, the power levels of subframes B7, B8 and B9 are kept substantially the same as their corresponding previous subframes in their SFGs, i.e., subframes B2, B3, and B4, respectively. At subframe C2, the UE has not received a new TPC command, the power level of C2 is kept substantially the same as the previous subframe of the SFG {2, 7}, i.e., subframe B7. At subframe C3, a new accumulative TPC command −1 dB is received, therefore, the UE decreases the power level of C3 by 1 dB. Since this TPC command is only applied to the SFG {3, 8}, the power levels of subframes C4 and C7 are not affected by the received TPC command. Hence, the power levels of subframes C4, and C7 are kept substantially the same as their corresponding previous subframes in their SFGs, i.e., subframes B9, and C2, respectively. At subframe C8, another accumulative TPC command −1 dB is received. Hence, the power level of C8 is decreased by 1 dB, but the power level of C9 is not affected by the TPC command and is kept substantially the same as its previous subframe C4 in the SFG {4, 9}.

Figure 7:
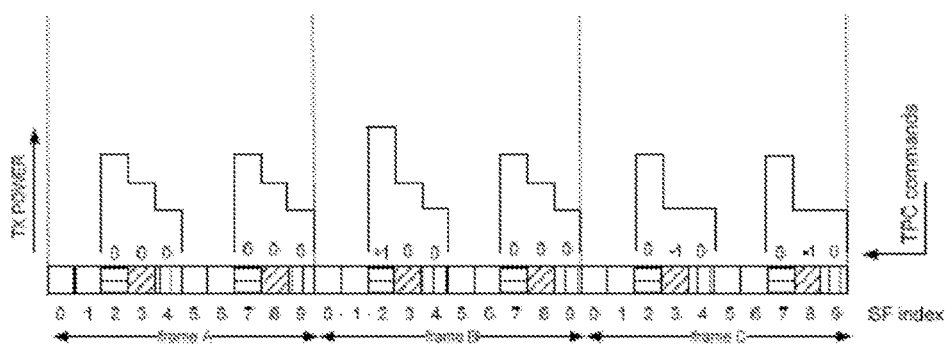
FIG. 7 shows another example of power control in accordance with an example embodiment of the application.

FIG. 7 shows another example of power control in accordance with an example embodiment of the application. In FIG. 7, the absolute TPC command is applied to the subframe where the UE is currently scheduled. In this example, we assume the substantially the same setup and notation as those in the examples of FIGS. 5 and 6, i.e., three SFGs {2, 7}, {3, 8} and {4, 9}, respectively denoted by three different boxes, three frames A, B and C, and the subframe will be represented by the frame index and subframe index. In this example, the UE, e.g., the UE 102 in FIG. 1, receives three absolute TPC commands +1 dB for subframe B2, −1 dB for subframe C3, and −1 dB for subframe C8. The three SFGs have different power levels in frame A, because separate reference levels of power control have been assigned to them, e.g., separate $P_{O\_NOMINAL\_PUSCH}$ (LSFG) and/or $P_{O\_UE\_PUSCH}$ (j, SFG). In this example, the power levels of subframes in frame A are assumed to be baseline power values for the subframes.

In the example illustrated in FIG. 7, at subframe B2, the UE receives the absolute TPC command +1 dB and increases the transmission power by 1 dB at subframe B2 from the baseline power value of A2. Since this TPC command is only applied to the subframe B2, the power levels of subframes B3 to B9 are not affected by the received TPC command.

Continuing in the example of FIG. 7, since TPC command is 0 at subframe C2, its power level is kept substantially the same as the base line power value, which is the power level of A2. At subframe C3, a new absolute TPC command −1 dB is received, therefore, the UE decreases the power level of C3 by 1 dB from its baseline power value of A3. Since this TPC command is only applied to the subframe C3, the power levels of subframes C4 and C7 are not affected by the received TPC command. At subframe C8, another absolute TPC command −1 dB is received. Hence, the power level of C8 is decreased by 1 dB from its baseline power value of A8, but the power level of C9 is not affected by the TPC command.

Note that in an example embodiment, the absolute TPC command may also be defined such that, within a frame, it applies to the subframes in the same SFG as the subframe where the TPC command is received.

In an example embodiment, different combinations of power control procedures can be conceived, where the UE may be requested to apply accumulative power control in some SFGs and absolute power control in other SFGs.

SFG dependent power control may be defined similarly for PUCCH. For example, when the example flexible frame structure illustrated in FIG. 2 is adopted, PUCCH may be located in some subframes that need more protection. In this case, PUCCH follows the power control command defined for these protected subframes. In another example, when TDM eICIC is deployed, SFG dependent power control for PUCCH may be defined.

Figure 8A:
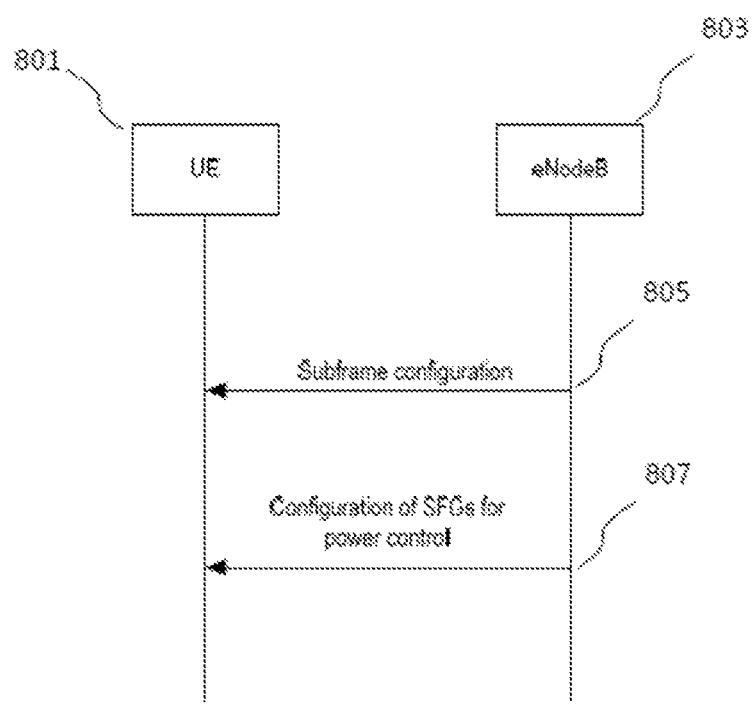
FIG. 8a illustrates an example signaling chart for configuration of subframe group (SFG) in accordance with an example embodiment of the application.

FIG. 8a illustrates an example signaling chart for configuration of SFG in accordance with an example embodiment of the application. In FIG. 8a, a UE 801 that supports flexible TDD operation is informed of such configuration by an eNB 803. At 805, the eNB 803 sends the information regarding the subframe configuration to the UE 801. In an example embodiment, if the flexible frame structure illustrated in FIG. 2 is deployed, the subframe configuration of UE 801 may be configured as one of 302, 304 and 306 in FIG. 3. At 807, the eNB 803 notifies the UE 801 the configuration of SFGs for power control purpose. For example, assuming the scenario of FIG. 3, the UE 801 may be informed that the SFGs are defined as {2, 7}, {3, 9} and {4, 9}. In another example based on FIG. 4, the UE 801 may be informed that the SFGs are defined as {0, 1, 2} and {3 to 15}. In an example embodiment, the subframe configuration and configuration of SFGs may be transmitted from the eNB to the UE in a single message. In another example embodiment, the subframe configuration and configuration of SFGs may be transmitted from the eNB to the UE in separate messages.

Figure 8B:
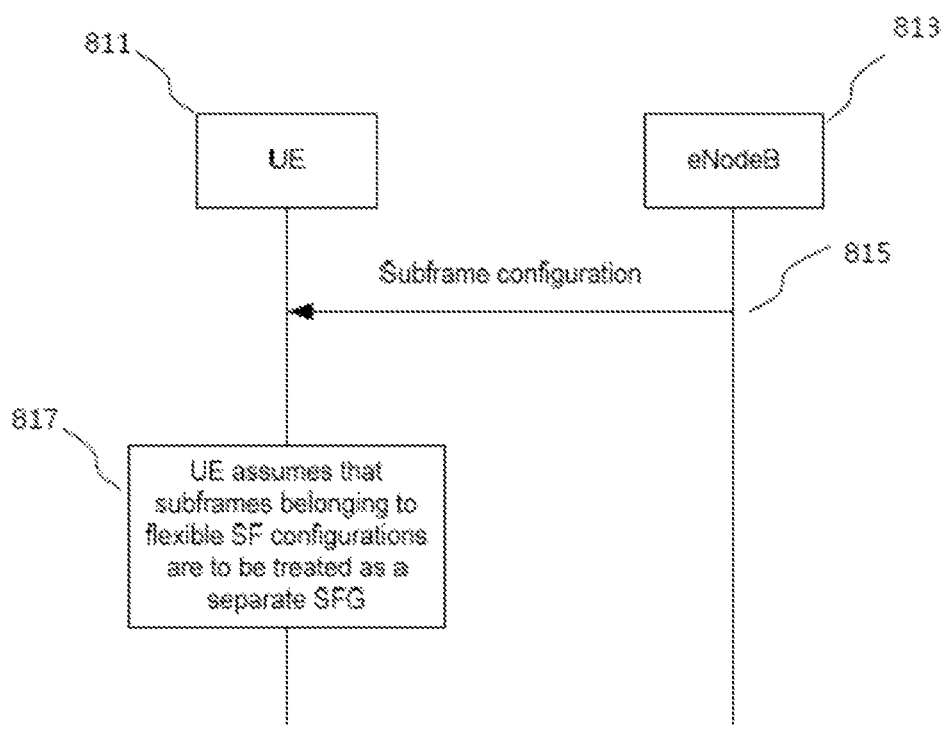
FIG. 8b illustrates another example signaling chart for configuration of SFG in accordance with an example embodiment of the application.

FIG. 8b illustrates another example signaling chart for configuration of SFG in accordance with an example embodiment of the application. In FIG. 8b, a UE 811 that supports flexible TDD operation is informed of such configuration by an eNB 813. At 815, the eNB 813 sends the information regarding the subframe configuration to the UE 811. In an example embodiment, if the flexible frame structure illustrated in FIG. 2 is deployed, the subframe configuration of UE 811 may be configured as one of 302, 304 and 306 in FIG. 3. However, not like the eNB 803 of FIG. 8a, eNB 813 does not explicitly notify the UE 811 the configuration of SFGs for power control purpose. Instead, at 817, the UE 811 may assume a default SFG configuration. For example, when the flexible frame structure illustrated in FIG. 2 is adopted, the UE 811 may consider that the flexible subframes are to be treated as a separate SFG, i.e., SFGs are defined as {2, 7} and {3, 4, 8, 9}.

Figure 9A:
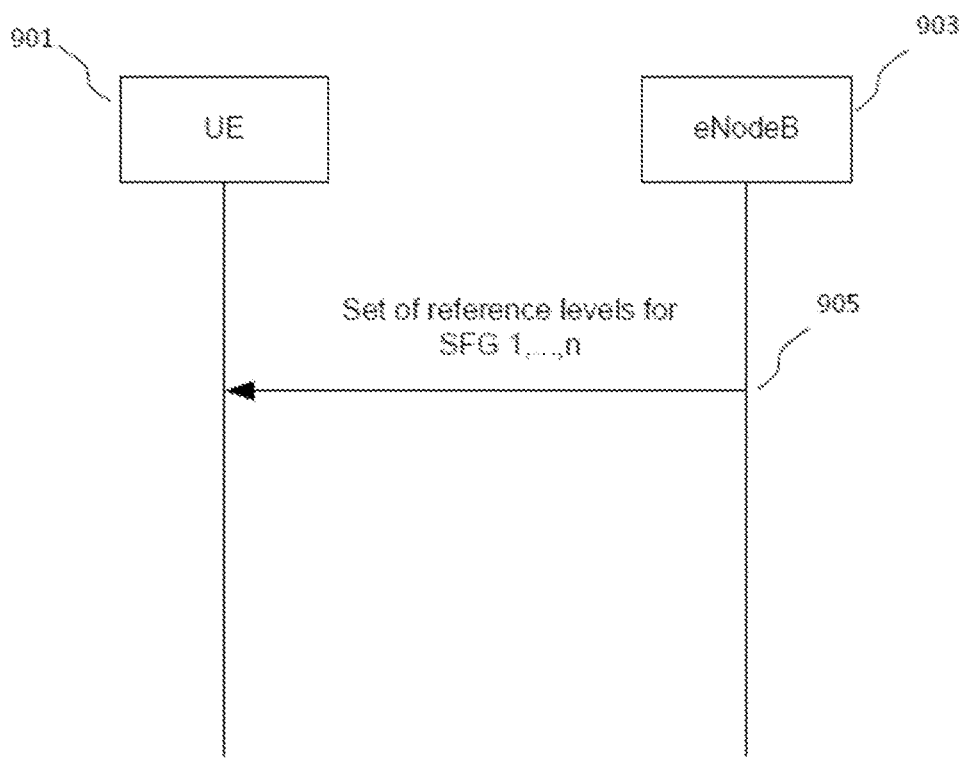
FIG. 9a shows an example signaling chart for configuration of reference levels for power control in accordance with an example embodiment of the application.
Figure 9B:
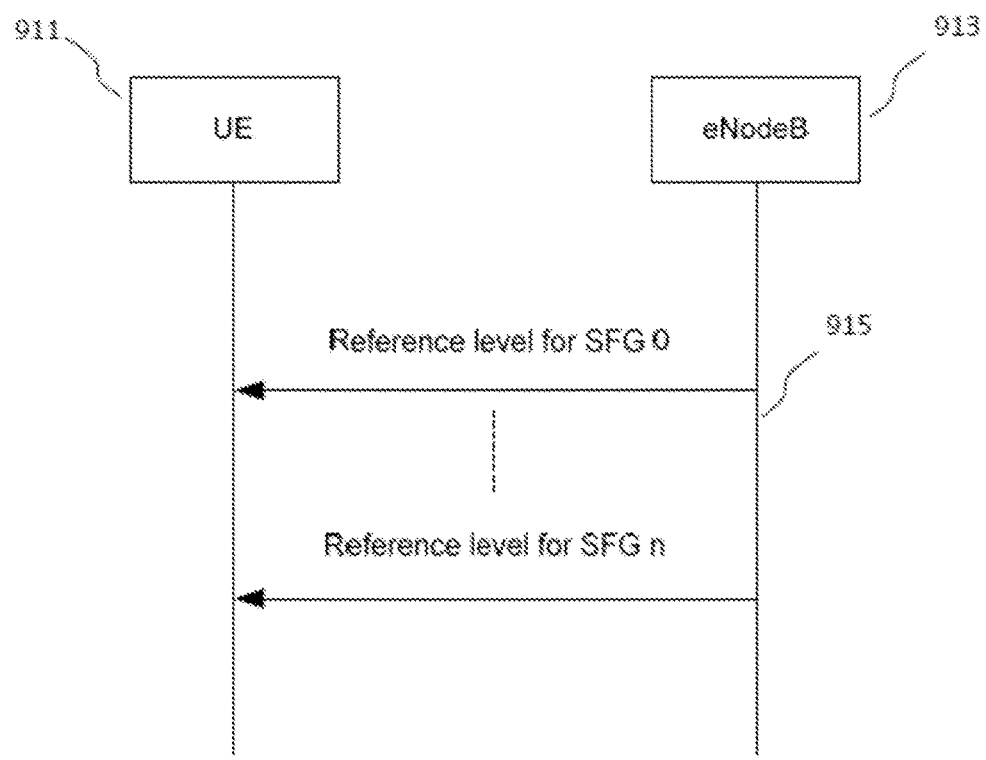
FIG. 9b shows another example signaling chart for configuration of reference levels for power control in accordance with an example embodiment of the application.

As discussed earlier, the network may configure separate reference levels to be used in different SFGs. FIG. 9a shows an example signaling chart for configuration of reference levels for power control in accordance with an example embodiment of the application. In this example, the reference levels for power control, e.g., $P_{O\_NOMINAL\_PUSCH}$ (j, SFG) and/or $P_{O\_UE\_PUSCH}$(j, SFG) for different SFGs are sent from an eNB 903 to an UE 901 in a single message at 905. FIG. 9b shows another example signaling chart for configuration of reference levels for power control in accordance with an example embodiment of the application. In this example, the reference levels for power control, e.g., $P_{O\_NOMINAL\_PUSCH}$ (j, SFG) and/or $P_{O\_UE\_PUSCH}$ (j, SFG) for different SFGs are sent from an eNB 913 to an UE 911 independently at 915.

In an example embodiment, in case the flexible subframes are treated as one single SFG, the network may signal the UE the reference levels with a bit indicating if it applies to "normal" or "flexible" subframes. In another example embodiment, a bitmap may be used to indicate the SFGs where the separate reference levels are applied. In an example embodiment, the reference levels may be sent as absolute values independently for different SFGs. In another example embodiment, the reference levels may be sent as an absolute vale for one pre-defined SFG and differential values for other SFGs.

Note that in an example embodiment, the frame configuration in own and neighboring cells may be stable over time. In this case, if accumulative TPC commands are used independently for each SFG, and if a UE is scheduled a few times in different SFGs in order to allow for proper adaptation, it is possible that the UE may converge to stable transmit power levels in different SFGs without specifically assigning different reference power levels.

It is useful to note that in various example embodiments presented in FIGS. 5, 6 and 7, for illustration purpose, the UE may receive the power control command and apply it in the same subframe. In other example embodiments, certain timing relationship may be predefined or configured between the subframe where the UE receives the power control command and the subframe where the received power control command is applied. In an example embodiment, the timing relationship may be taken into account when the network signals the corresponding UL scheduling grants, possibly including power control commands, to the UE. In an example embodiment, TPC commands for different SFGs may be transmitted in a single message, e.g., a LTE PDCCH DCI format 3/3A message, by assigning a TPC index per SFG.

Figure 10:
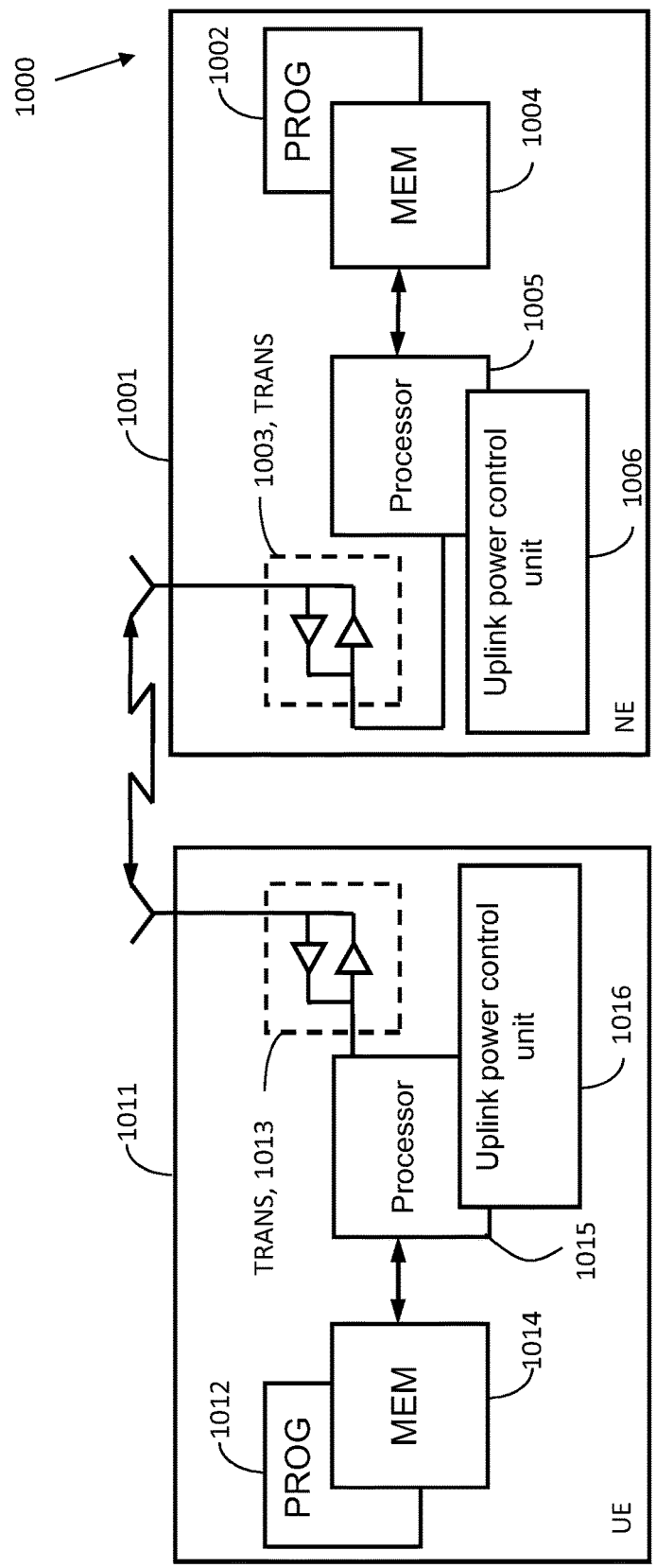
FIG. 10 illustrates a simplified block diagram of various example apparatuses that are suitable for use in practicing various example embodiments of this application.

Reference is made to FIG. 10 for illustrating a simplified block diagram of various example apparatuses that are suitable for use in practicing various example embodiments of this application. In FIG. 10, a wireless network 1000 is adapted for communication with a UE 1011 via a network element (NE) 1001, such as eNB 803, 813, 903 or 913 of FIGS. 8a, 8b, 9a and 9b, respectively. The UE 1011 includes a processor 1015, a memory (MEM) 1014 coupled to the processor 1015, and a suitable transceiver (TRANS) 1013 (having a transmitter (TX) and a receiver (RX)) coupled to the processor 1015. The MEM 1014 stores a program (PROG) 1012. The TRANS 1013 is for bidirectional wireless communications with the NE 1001.

The NE 1001 includes a processor 1005, a memory (MEM) 1004 coupled to the processor 1005, and a suitable transceiver (TRANS) 1003 (having a transmitter (TX) and a receiver (RX)) coupled to the processor 1005. The MEM 1004 stores a program (PROG) 1002. The TRANS 1003 is for bidirectional wireless communications with the UE 1011. The NE 1001 is coupled to one or more external networks or systems, which is not shown in this figure.

As shown in FIG. 10, the NE 1011 may further include an uplink power control unit 1006 for subframe configuration, configuration of SFGs for power control, determination of reference levels for SFGs and generation of power control command. The unit 1006, together with the processor 1005 and the PROG 1002, may be utilized by the NE 1001 in conjunction with various example embodiments of the application, as described herein.

As shown in FIG. 10, the UE 1011 may further include an uplink power control unit 1016 for processing signaling information regarding subframe configuration, configuration of SFGs for power control, reference levels for SFGs, and power control command. The unit 1016, together with the processor 1015 and the PROG 1012, is configured to perform the uplink power control in accordance with various example embodiments of the application, as described herein.

At least one of the PROGs 1002 and 1012 is assumed to include program instructions that, when executed by the associated processor, enable the electronic apparatus to operate in accordance with the example embodiments of this disclosure, as discussed herein.

In general, the various example embodiments of the apparatus 1011 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The example embodiments of this disclosure may be implemented by computer software or computer program code executable by one or more of the processors 1005, 1015 of the NE 1001 and the UE 1011, or by hardware, or by a combination of software and hardware.

The MEMs 1004 and 1014 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processors 1005 and 1015 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be allowing the UE to adapt its power level effectively during various situations. This helps to mitigate the interference variations or their effect, caused by dynamic subframe allocation, and to protect control signals efficiently in an eICIC system.

Embodiments of the present invention may be implemented in software, hardware, application logic or a combination of software, hardware and application logic. The software, application logic and/or hardware may reside on an apparatus such as a user equipment, a Node B or other mobile communication devices. If desired, part of the software, application logic and/or hardware may reside on an eNode B/base station 1001, part of the software, application logic and/or hardware may reside on a user equipment 1011, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

For example, while the example embodiments have been described above in the context of the LTE system for uplink power control, it should be appreciated that the example embodiments of this invention are not limited for use with only this one particular type of wireless communication system, and that they may be used to advantage in other wireless communication systems and in downlink power control.

Further, the various names used for the described parameters are not intended to be limiting in any respect, as these parameters may be identified by any suitable names. Further, the various names assigned to different channels (e.g., PDCCH, etc.) are not intended to be limiting in any respect, as these various channels may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

What is claimed is:

1. A method, comprising:
   processing at a user equipment a communication with a network element, wherein the communication comprising one or more frames, and wherein each of the one or more frames comprises at least two subframes;
   receiving at the user equipment a signal indicating a definition of subframe groups each comprising at least one of the at least two subframes in a time domain, wherein the definition defines a plurality of subframes which are subjected to power control as a subframe group;

receiving at the user equipment separate reference power levels for each of the subframe groups, wherein the reference power levels define a power level for the user equipment to use during a transmission;

receiving at the user equipment a power control command for controlling a transmission power associated with at least one of the subframe groups; and controlling power at the user equipment by applying the power control command to the reference power levels for at least one of the subframe groups.

2. The method as claimed in claim 1, wherein applying the power control command comprises at least one of applying the power control command to at least one of the at least two subframes where the communication is scheduled, applying the power control command to a plurality of the subframe groups where the communication is scheduled, and applying the power control command to at least one of the at least two subframes where the communication is scheduled and the corresponding subframes in a same one of the subframe groups.

3. The method as claimed in claim 2, wherein the transmission power of at least one of the subframes is based at least on the received power control command and the transmission power of a previous subframe belonging to the same one of the subframe groups.

4. The method as claimed in claim 1, wherein a timing relationship between at least one of the at least two subframes where the power control command is received and another of the subframes where the power control command is applied, is predefined.

5. A method as claimed in claim 1, wherein receiving a power control command comprises receiving separate power control commands for each of the subframe groups in a single message with a power control command index assigned for each of the subframe groups.

6. The method according to claim 1, wherein the power control command is an accumulative power control command.

7. An apparatus, comprising:
at least one processor; and
at least one memory including computer program code, wherein the at least one memory and the computer program code are configured to, with the at least one processor, cause the apparatus at least to:
process at a user equipment a communication with a network element, wherein the communication comprising one or more frames, and wherein each of the one or more frames comprises at least two subframes;
receive at the user equipment a signaling indicating a definition of subframe groups each comprising at least one of the at least two subframes in a time domain, wherein the definition defines a plurality of subframes which are subjected to power control as a subframe group;
receive at the user equipment separate reference power levels for each of the subframe groups, wherein the reference power levels define a power level for the user equipment to use during a transmission;
receive at the user equipment a power control command for controlling a transmission power associated with at least one of the subframe groups; and control power at the user equipment by applying the power control command to the reference power levels for at least one of the subframe groups.

8. The apparatus as claimed in claim 7, wherein the power control command is applied to at least one of the subframes where the communication is scheduled, a plurality of subframe groups where the communication is scheduled, and at least one of the subframes where the communication is scheduled and the corresponding subframes in a same one of the subframe groups.

9. The apparatus as claimed in claim 8, wherein the transmission power of at least one of the subframes is based at least on the received power control command and the transmission power of a previous subframe belonging to the same one of the subframe groups.

10. The apparatus as claimed in claim 7, wherein the timing relationship between at least one of the subframes where the power control command is received and another of the subframes where the power control command is applied, is predefined.

11. The apparatus as claimed in claim 7, wherein the power control command is received as separate power control commands for each of the subframe groups in a single message with a power control command index assigned for each of the subframe groups.

12. The apparatus as claimed in claim 7, wherein the power control command is an accumulative power control command.

13. A computer program product comprising a non-transitory computer-readable medium bearing computer program code embodied therein for use with a computer, the computer program code when executed in hardware perform a process comprising:
processing at a user equipment a communication with a network element, wherein the communication comprising one or more frames, and wherein each of the one or more frames comprises at least two subframes;
receiving at the user equipment a signaling indicating a definition of subframe groups each comprising at least one of the at least two subframes in a time domain, wherein the definition defines a plurality of subframes which are subjected to power control as a subframe group;
receiving at the user equipment separate reference power levels for each of the subframe groups, wherein the reference power levels define a power level for the user equipment to use during a transmission;
receiving at the user equipment a power control command for controlling a transmission power associated with at least one of the subframe groups; and
controlling power at the user equipment by applying the power control command to the reference power levels for at least one of the subframe groups.

14. The computer program product as claimed in claim 13, wherein the computer program code for applying the power control command comprises code for at least one of applying the power control command to at least one of the subframes where the communication is scheduled, applying the power control command to a plurality of subframe groups where the communication is scheduled, and applying the power control command to at least one of the subframes where the communication is scheduled and the corresponding subframes in a same one of the subframe groups.

15. The computer program product as claimed in claim 14, wherein the transmission power of at least one of the subframes is based at least on the received power control command and the transmission power of a previous subframe belonging to the same one of the subframe groups.

16. The computer program product as claimed in claim 13, wherein the timing relationship between at least one of the subframes where the power control command is received and another of the subframes where the power control command is applied, is predefined.

17. The computer program product as claimed in claim 13, wherein the computer program code for receiving a power control command comprises code for receiving separate power control commands for each of the subframe groups in a single message with a power control command index assigned for each of the subframe groups.

18. The computer program product as claimed in claim 13, wherein the power control command is an accumulative power control command.

19. A method, comprising:
processing a communication with a user equipment, wherein the communication comprising one or more frames, and wherein each of the one or more frames comprises at least two subframes;
defining various subframe groups each comprising at least one of the at least two subframes in a time domain;
generating a signaling indicating a definition of the subframe groups, wherein the definition defines a plurality of subframes which are subjected to power control as a subframe group;
generating separate reference power levels for at least one of the subframe groups, wherein the reference power levels define a power level for a user equipment to use during a transmission;
generating a power control command for controlling a transmission power of the user equipment associated with at least one of the subframe groups; and
transmitting the signaling indicating the definition of the subframe groups, the reference power levels, and the power control command to the user equipment.

20. The method as claimed in claim 19, wherein defining that the various subframe groups comprise at least one of measuring interference levels at each of the subframes and exchanging information between network elements on selected frame configurations.

21. The method as claimed in claim 19, wherein generating of the a power control command comprises generating separate power control commands for each of the subframe groups in a single message with a power control command index assigned for each of the subframe groups.

22. An apparatus, comprising:
at least one processor; and
at least one memory including computer program code, wherein the at least one memory and the computer program code are configured to, with the at least one processor, cause the apparatus at least to:
process a communication with a user equipment, wherein the communication comprising one or more frames, and wherein each of the one or more frames comprises at least two subframes;
define various subframe groups each comprising at least one of the at least two subframes in a time domain;
generate a signaling indicating a definition of the subframe groups, wherein the definition defines a plurality of subframes which are subjected to power control as a subframe group;
generate separate reference power levels for at least one of the subframe groups, wherein the reference power levels define a power level for the user equipment to use during a transmission; and
generate a power control command for controlling a transmission power of the user equipment associated with at least one of the subframe groups; and
transmit the signaling indicating the definition of the subframe groups, the reference power levels, and the power control command to the user equipment.

23. A computer program product comprising a non-transitory computer-readable medium bearing computer program code embodied therein for use with a computer, the computer program code when executed in hardware perform a process comprising:
processing a communication with a user equipment, wherein the communication comprising one or more frames, and wherein each of the one or more frames comprises at least two subframes;
defining various subframe groups each comprising at least one of the at least two subframes in a time domain;
generating a signaling indicating a definition of the subframe groups, wherein the definition defines a plurality of subframes which are subjected to power control as a subframe group;
generating separate reference power levels for at least one of the subframe groups, wherein the reference power levels define a power level for the user equipment to use during a transmission;
generating a power control command for controlling a transmission power of the user equipment associated with at least one of the subframe groups; and
transmitting the signaling indicating the definition of the subframe groups, the reference power levels, and the power control command to the user equipment.

* * * * *